United States Patent [19]
Martin et al.

[11] Patent Number: 5,870,093
[45] Date of Patent: Feb. 9, 1999

[54] SYSTEM AND METHOD SUPPORTING LIKENESS DETERMINATION USING A GUI TO SIMPLIFY IMAGE ANALYSIS

[75] Inventors: Jean-Paul Hugues Martin, Oakton, Va.; Jerry Douglas Paxson, Bethesda, Md.; John Arthur Schmitz, Middletown, Md.; Sam Steppel, Potomac, Md.

[73] Assignee: Media Cybernetics, L.P., Silver Spring, Md.

[21] Appl. No.: 662,374

[22] Filed: Jun. 12, 1996

[51] Int. Cl.$^6$ ............................................. G06F 3/14

[52] U.S. Cl. ............................................. 345/354

[58] Field of Search ..................... 395/352, 354, 395/353, 326, 328, 333, 334, 339, 965, 968, 133, 964, 763; 364/188; 345/352, 354, 353, 326, 328, 333, 334, 339, 433, 965, 968, 964; 707/502

[56] References Cited

U.S. PATENT DOCUMENTS

| | | | |
|---|---|---|---|
| 5,191,645 | 3/1993 | Carlucci et al. | 345/328 |
| 5,237,647 | 8/1993 | Roberts et al. | 345/419 |
| 5,555,357 | 9/1996 | Fernandes et al. | 345/441 |
| 5,596,691 | 1/1997 | Good et al. | 345/440 |
| 5,651,120 | 7/1997 | Kitagawa et al. | 345/352 |

*Primary Examiner*—Matthew M. Kim
*Assistant Examiner*—Crescelle N. dela Torre
*Attorney, Agent, or Firm*—Sterne, Kessler, Goldstein & Fox PLLC

[57] ABSTRACT

A system, method and computer program product that permit a user to view an image of an object on a graphical user interface (GUI) and perform operations on the image. The method comprising the steps of displaying a set of pictorial representation types on the GUI and allowing the user to select one of the pictorial representation types, by making a likeness determination between the image and the set of pictorial representation types. The system performs a process on the image based on the selected pictorial representation type.

29 Claims, 9 Drawing Sheets

SYSTEM AND METHOD SUPPORTING LIKENESS DETERMINATION USING A GUI TO SIMPLIFY IMAGE ANALYSIS

BACKGROUND OF THE INVENTION

1. Field of the Invention

The present invention is directed to a computer system, and more particularly, to computer system and method supporting likeness determination using a graphical user interface to simplify image analysis.

2. Related Art

Recent advances in personal computers and workstations has enabled businesses to adapt the computer to a variety of tasks once reserved for the computer literate. Traditionally, complex computational tasks required skilled users to program computers for data gathering, analysis, and the like.

Even scientifically inclined persons required special computer training. Training typically began by learning computer languages such as Fortran, Pascal or C, and developing a familiarity with computer operating systems such as DOS or UNIX. The cost of hiring or training people to use computers added to the problem of using computers for a wider variety of tasks.

Competition in the computer manufacturing industry over the past decade has led to a dramatic cost reduction for computers. This cost reduction coupled with technology advancements has spawned the software industry to develop applications that made using computers easier.

An important development that accelerated the use of computers was the evolution of the graphical user interface (GUI), which followed the character user interface (CUI or "chewy"). Two popular GUIs are the Apple® Macintosh® and Microsoft® Windows™ interfaces. Both interfaces are WYSIWYG ("what you see is what you get") interfaces. This interface uses "windows" to display various operations (e.g., file transfer, setup utilities, messaging, etc.) and applications (e.g, word processors, games, etc.) to the user to interface with the computer. Microsoft® and many UNIX®-based developers have adopted similar window-based GUIs. Window-based software applications have become the default user interface for computers.

Many computational-intensive scientific and engineering software applications were slow to be implemented as window-based applications. However, object-oriented programming techniques have simplified writing window-code for complicated applications. These programming techniques have also made window-based applications more flexible with regard to how they can present and reproduce data.

The use of icons has also simplified interaction with computers. For example, state-of-the-art spreadsheet applications, such as Microsoft® Excel, include an interface to facilitate the displaying and printing of spreadsheet data. Via a pull-down menu, a user can access a window that prompts the user to select a display or print option. The options are displayed as small pictorial representations (e.g., buttons or icons). The buttons or icons are representative of what the data can look like (e.g., a histogram, pie-chart, bar graph, or the like). The user can simply use a pointing device to "click" the bar graph button to display the spreadsheet data as a bar graph. The new bar graph can then be printed. This functionality simplifies the display/print process. Conventionally, the user would have to specially format the data and follow a series of (sometime complicated) operations to yield the desired result. In this example, formatting of the data has been eliminated. If the user decides the bar graph does not connote the desired meaning, he need only select a different pictorial representation.

The present invention does not use images to represent a desired output format of the data, but it uses images to permit non-specialized users to perform operations on data that doesn't require the user to posses in-depth knowledge of the data.

SUMMARY OF THE INVENTION

The present invention is a system and method including a graphical user interface (GUI). The GUI permits a user to view an image of an object and perform predetermined operations on that image.

The present invention exemplifies the phrase "a picture is worth a thousand words." A feature of the present invention is the simplification of the user interface and interaction by representing a type of image rather than using words to describe the object the image represents.

The user first evaluates the image by making a likeness determination between visual characteristics of the image and pictorial representations of various image types from a selected file within a database. The pictorial representations types in a given file can be organized according to categories of related objects. Various predetermined operations are associated with the pictorial representation types. According to this selection, the system performs operations on the image and generates/displays results.

For example, a category of related objects can include images of microscopic structures of alloys and metals. Pictorial representation of materials in the database can include metallic grain edge images, grain color images, alloy phases images, coating section images, or the like. A user operating the system is presented with (or accesses by opening an image file) a new image of a structure to evaluate. The only information the user has is that the structure belongs to a specific category; in this example it is a metal alloy. The user then selects the material database to access a window including a palette of pictorial representation types. Upon visual inspection of the new image to be evaluated, the user selects a pictorial representation type that resembles the image. The system then performs the predetermined operations on the new image that are associated with the selected pictorial representation type. An exemplary predetermined operation associated with a given pictorial representation type in this example can include calculating the phase distribution of the metal alloy. A further exemplary predetermined operation associated with this given pictorial representation type is to measure the grain size of the metallic structure within the new image.

In another embodiment of the invention, the user can add new pictorial representatives of new image types to the database.

In a still further embodiment, the user can modify the list of associated operations and store them as new defaults within the database.

The preferred embodiment of the invention is discussed in detail below. While specific steps, configurations and arrangements are discussed, it should be understood that this is done for illustrative purposes only. A person skilled in the relevant art will recognize that other steps, configurations and arrangements can be used without departing from the spirit and scope of the invention.

BRIEF DESCRIPTION OF THE FIGURES

The present invention will be described with reference to the accompanying drawings, wherein.

The preferred embodiment of the invention is now described with reference to the figures where like reference numbers indicate identical or functionally similar elements. Also in the figures, the left most digit of each reference number corresponds to the figure in which the reference number is first used.

DETAILED DESCRIPTION OF THE PREFERRED EMBODIMENTS

1. Nomenclature

A "desktop icon" refers to a screen icon displayed on the output monitor of a computer system that is associated with a computer file available to the computer's operating system. Standard file operations can each be invoked with respect to the associated file by interactively performing a corresponding graphical procedure with the desktop icon. For example, a request to execute the program contained in a file might be invoked by double-clicking on the associated desktop icon. Similarly, a request to delete a file might be invoked by graphically moving or "dragging" the associated desktop icon onto the displayed icon of a trash can; or by cursor-clicking on the associated desktop icon and then cursor-clicking on a pull-down menu command labeled "delete." In response to such graphical actions, the operating system of the local computer system will then perform the requested operation.

A principle advantage of graphical, desktop-based interfaces of this nature is that the graphical procedure corresponding to each standard file operation is generic for all relevant desktop icons within a particular computer system. In other words, the graphical actions that serve to request standard file operations are independent of the identity of the particular icon and file being operated upon. Consequently, a user need only learn one basic set of relatively intuitive gestures to perform standard file operations on all files within the user's computer system.

Note that the set of standard file operations and the corresponding graphical manipulations vary among different computer platforms and operating systems. Typically, the set of standard file operations includes: deleting; naming; storing in directories; printing; displaying; executing programs within the file; providing file data as input to another, selected program. Other file operations would be apparent to a person skilled in the relevant art.

2. Operation

Figure 3:
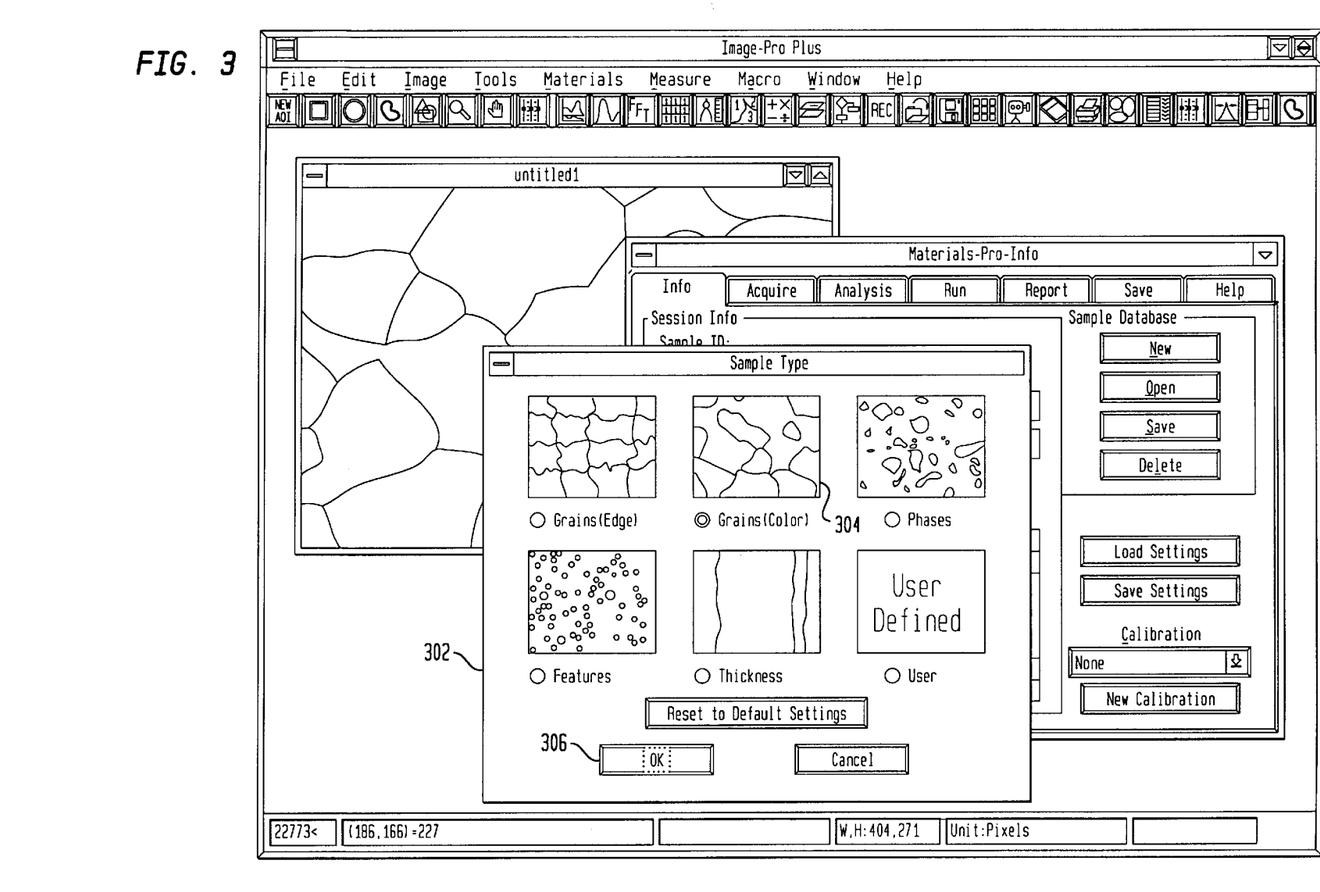
Figure 4:
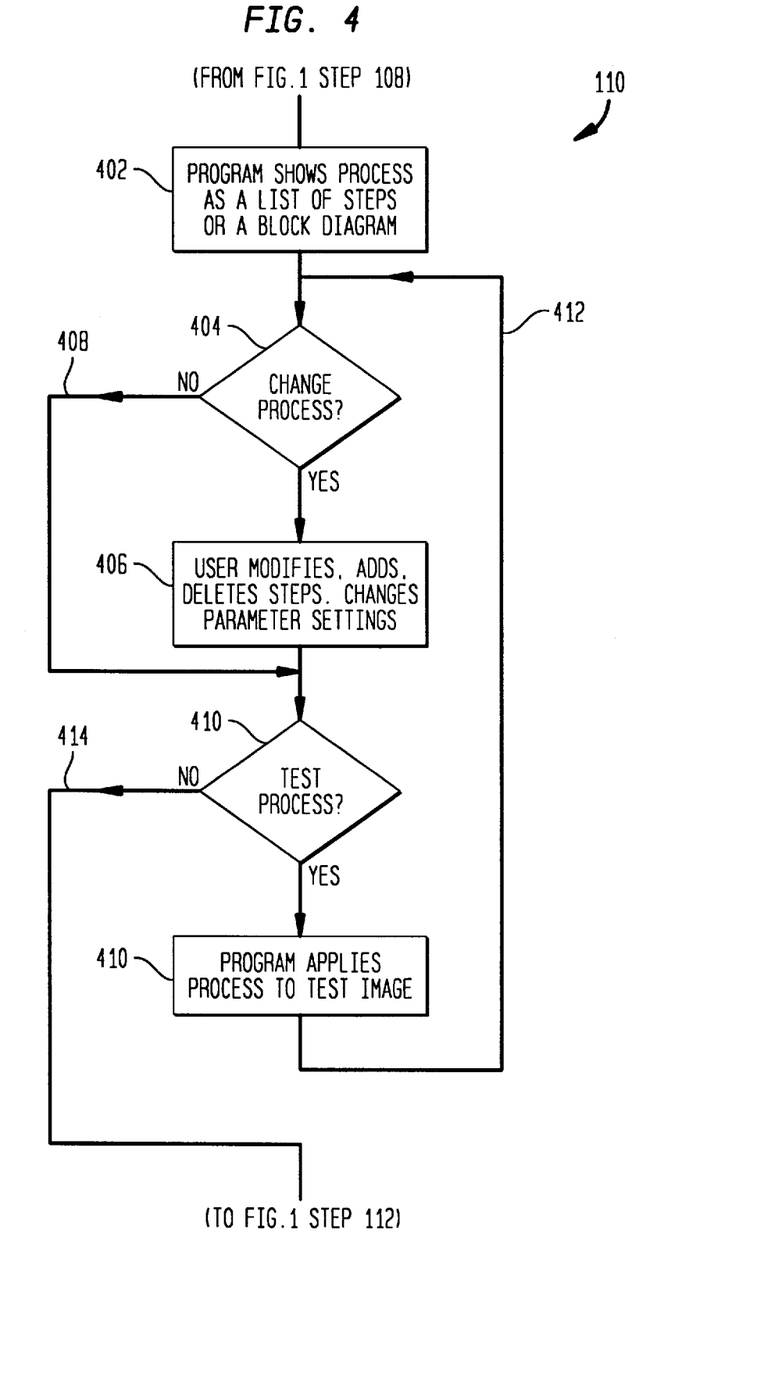

The present invention will now be described by referencing operational flow diagrams shown in FIGS. 1, 4 and 6 and exemplary display screens in FIGS. 2, 3, 5, 7 and 8. A preferred embodiment of the present invention will be described in connection with microscopic structures of alloys and metals.

Figure 1:
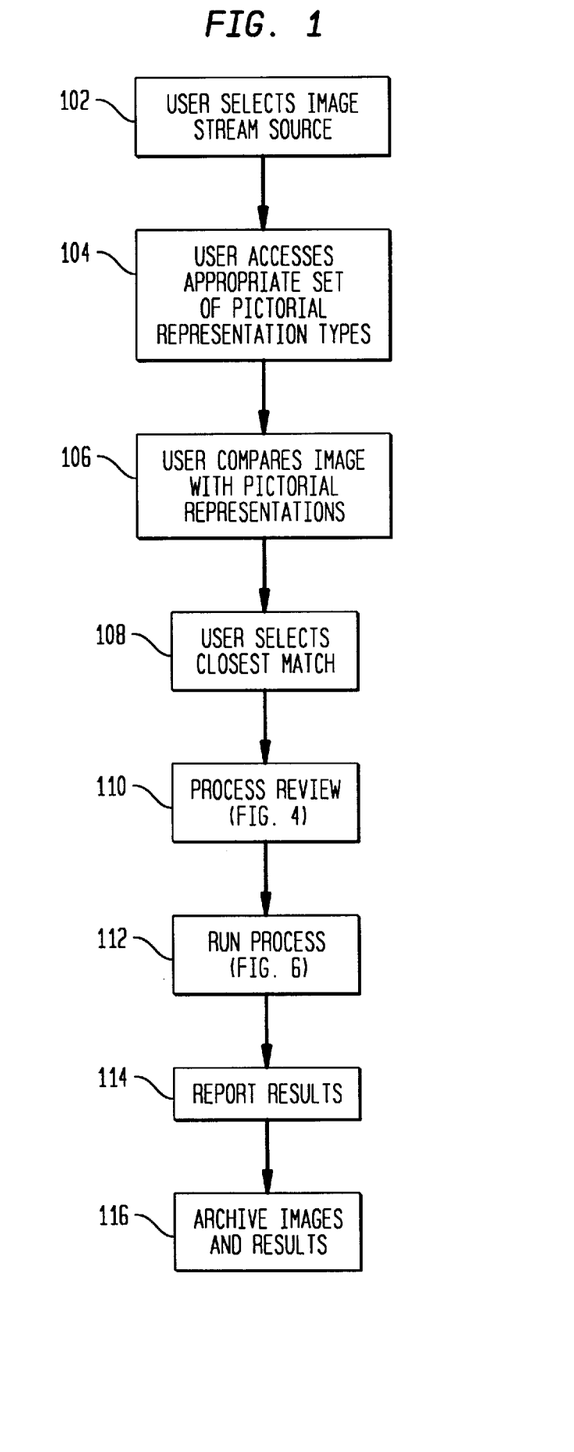
FIGS. 1, 4 and 6 show operational flow diagrams according to a preferred embodiment of the present invention.

FIG. 1 shows high level operational block diagram of the present invention. As shown at a step 102, the user begins by selecting an image stream source. The image can be selected by opening a file stored in a database. The stored image can be a digitized photograph or a micrograph of a structure, in this case, an alloy or a metal. The stored image can be in any conventional bit-map format. The image can be representative of a static image, such as computer scanned photograph or micrograph. Alternatively, the image stream source can be a video feed from a camera, videotape, scanner, or the like. Once the image stream source is selected, the user then accesses an appropriate set of pictorial representation types, as shown at 104.

Figure 2:
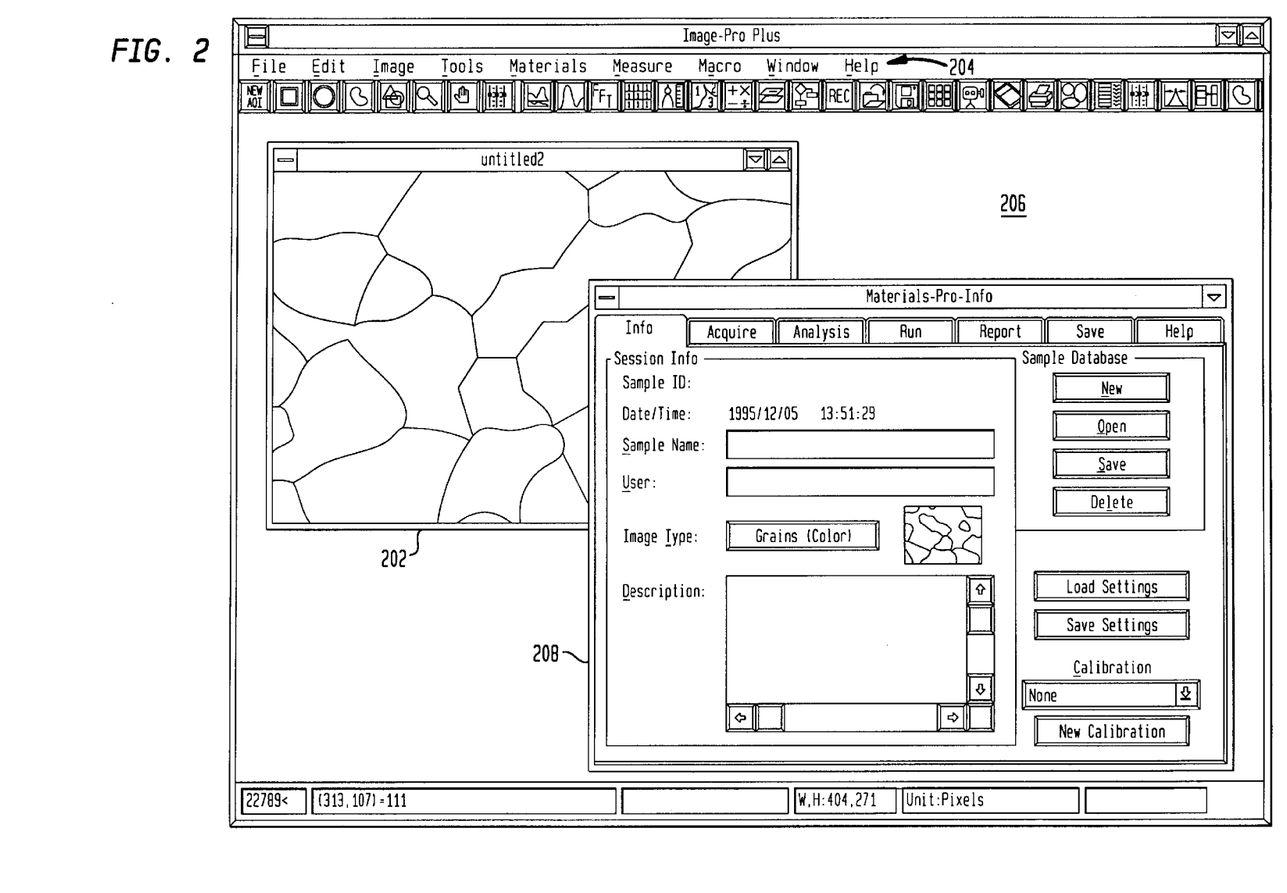
FIGS. 2, 3, 5, 7 and 8 show exemplary display screens according to the present invention.

FIG. 2 shows an exemplary screen shot of a graphical user interface in connection with the present invention. Window 202 represents an image selected by the user. This image could have been accessed using the pull-down menus 204 listed across the top of the main window 206, as would be apparent to a user of window-based interfaces. The image need not be displayed to the user to be tested.

A window 208, also accessible via menus 204, permits the user to access the sample database. The sample database shown in window 208 is titled "materials." This sample database window includes subscreens and functional buttons that permit the user to access the appropriate set of pictorial representation types in connection with step 104. An example set of pictorial representation types is shown in window 302 of FIG. 3. This sample type window displays a number of pictorial representation types to the user.

Turning again to FIG. 1, the user then performs a likeness determination by comparing the image in window 202 with the pictorial representations displayed in window 302, as shown generally at a step 106. The user then selects the closest match (see step 108) based on the likeness determination. The closest match in this example is the grain color sample type 304. The selection is made by the user via a point-and-click operation targeting either the pictorial representation of the sample type or a button to the left of the sample type labeled "Grains (Color)."

Once the user selects a sample type (e.g., sample type 304), the user can initiate processing on the image in window 202 by clicking an "OK" button 306. Before the process is initiated, the user is permitted to review the process, as shown generally at a step 110. Further details of the process review are shown in FIG. 4.

The application program displays the process as a list of process steps or a block diagram. This operation is represented by a step 402. A window 502 in FIG. 5 includes an example list of process steps 504 for the process to be performed on the image. The steps or operations within the process can be edited by adding or deleting steps from an "Operations List" 506. A set of predetermined operations can be assigned to the process 504. Additionally, the operations list 506 can include all possible operations or some limited subset thereof. The content of the operations list can be adjusted as shown generally at 508. A default set of process steps will be displayed by the system in list 504 according to the sample database selected. This default can also be changed by the user, or set merely to default to the last process used.

Changing of the process is shown generally at step 404. If the user wishes to change the process, he can modify, add or delete steps, or even change the primary settings, shown generally at step 406. If no changes are required, shown generally at 408, the user is given the option of testing the process, as shown generally at 410.

Testing is preferred in situations where the user has selected a group of images (which comprise an "image stream") to analyze. If the process has been changed, for example, certain operations to be performed in the process may not function properly on the particular images in the stream. Therefore, in order to determine this before attempting to process the entire stream, the user can test the new process. In this case, the system tests the process on one or a few images of the image stream.

Many factors may cause a given process step to fail. For example, an image stream may include images that depart too far from the ideal pictorial representation. In other words, images may be saturated or might have insufficient contrast. Alternatively, the image may be too noisy (i.e., too low signal-to-noise ratio).

Figure 5:
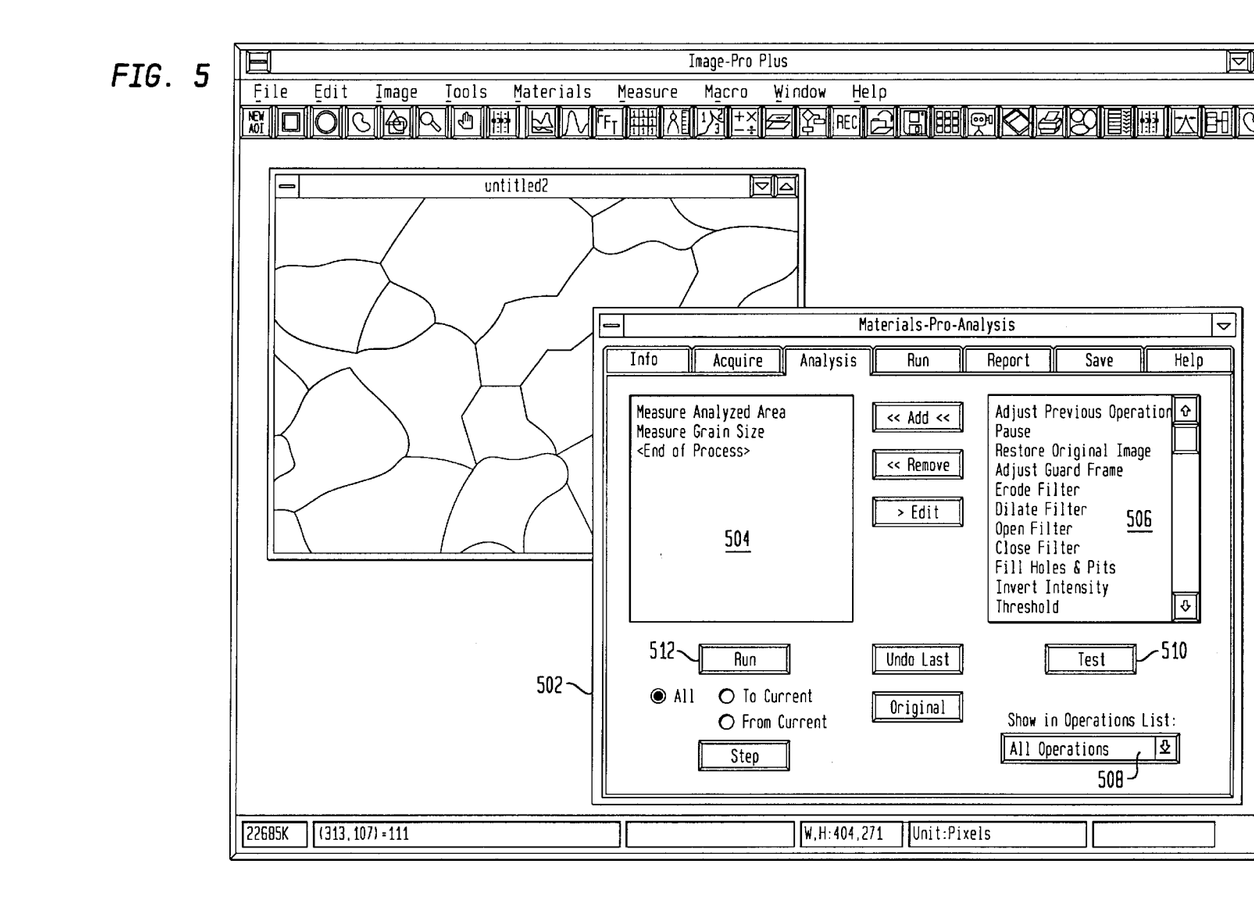

A "test" button 510 is included to perform the testing procedure. Results can be returned to the user via the application display in the event that a test fails. Test failure results can be returned to the user on an error-by-error basis or after the entire test has been performed. These details are application-specific, and would be apparent to a person skilled in the relevant art.

Application of the process to test the image is shown generally at a step 410. Once the test is completed, the user is given the option of again changing the process, as shown generally at loop 412. If the user decides not to test the process, process review is completed as shown generally at 414. Completing the process review is typically performed when the user selects a "RUN" button 512 in window 502.

Figure 6:
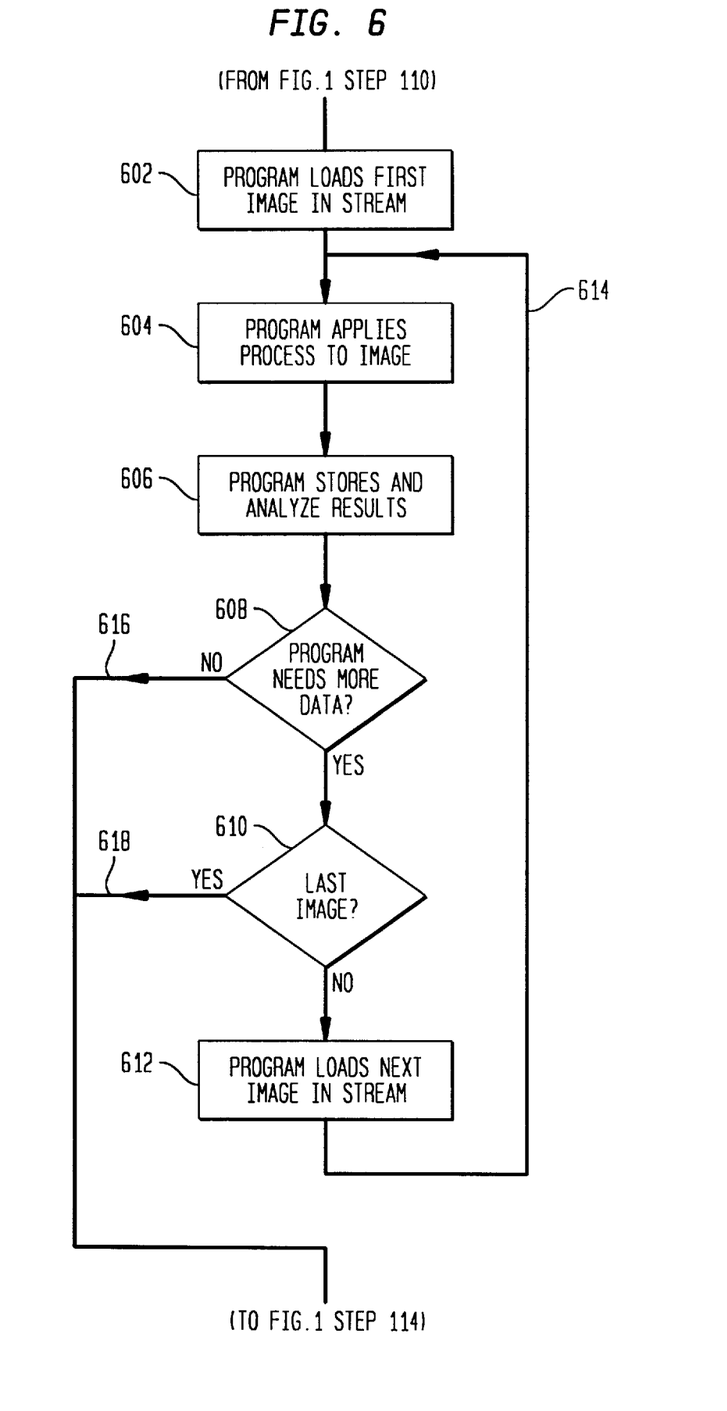

The run process is shown generally at a step 112, and in more detail in the FIG. 6. The program begins the process by loading the first image within the image stream, as shown at a step 602. As discussed above, the image stream may comprise images selected from one or more files in a database. Alternatively, the image stream can be a video stream from a camera or microscope. In an alternative embodiment of the invention, the user need not first display the image within a window such as window 202. The user may begin by simply selecting the sample database without changing or testing the process.

The program then applies the process to the image, as shown at a step 604. Any intermediate or final results are stored and then analyzed, as shown at a step 606. Decisional blocks 608 and 610 represent how the program determines whether more data needs to be generated (see step 608). If more data is required for any given process step, the program checks whether the last image in the stream has been processed, as shown at a step 610. If more data is required and the last image has not been analyzed, the process loops back to continue processing, as shown generally at a step 612 and a loop 614. If the program does not require more data, the program can stop processing images in mid-stream, as shown generally at 616. But if the program needs more data and the last image has been processed, as shown generally at 618, the process stops and reports this result to the user, as shown generally at a step 114. Finally, the user can archive images and any process results at a step 116.

The "need more data" step 608 can have various implications. For example, consider a particular process step that performs a statistical analysis on image data. Too few images may be in the stream in order to yield sufficient sample or population information for a complete statistical analysis. Alternatively, if a statistical result such as a mode, mean, or standard deviation is reached by convergence of sample data, processing is stopped at 616 for that particular operation since no more data is required.

In a still further example of step 608, the program can include user-defined parameters for individual operations within a process. For a microstructure application, specific industry standards (e.g., American Society of Metallurgy ASTM 112 standard) may dictate a minimum surface area of a sample image. A motorized stage and scanning camera or microscope can be coupled to the computer implementing the present invention. According to the invention, the user can specify a specific scanning pattern so that enough data will be included in the image stream to meet the requirements of the standard. The details of the motorized stage and camera are beyond the scope of this invention, but interfacing computer hardware and software for data acquisition would be apparent to one skilled in the art.

Figure 7:
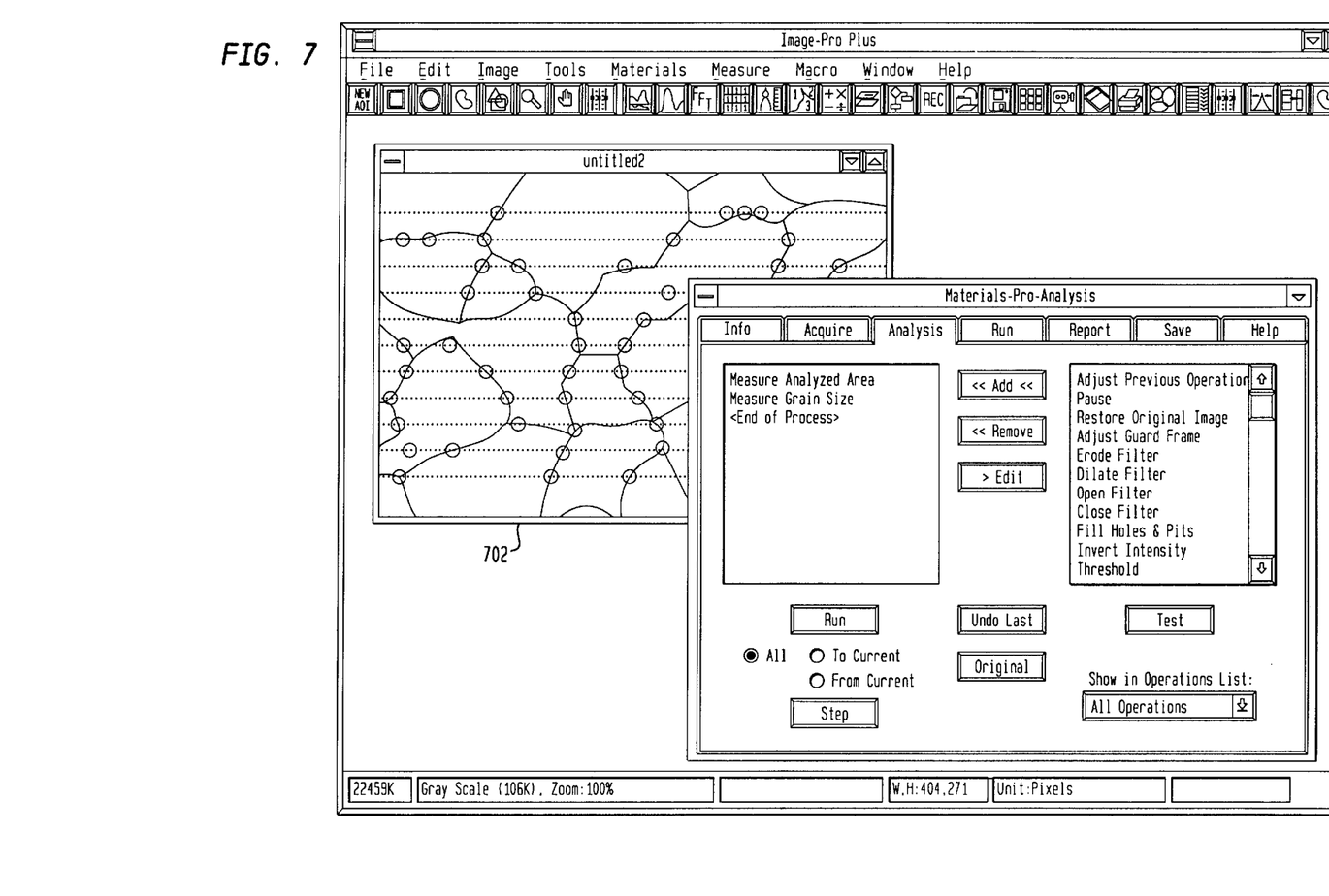
Figure 8:
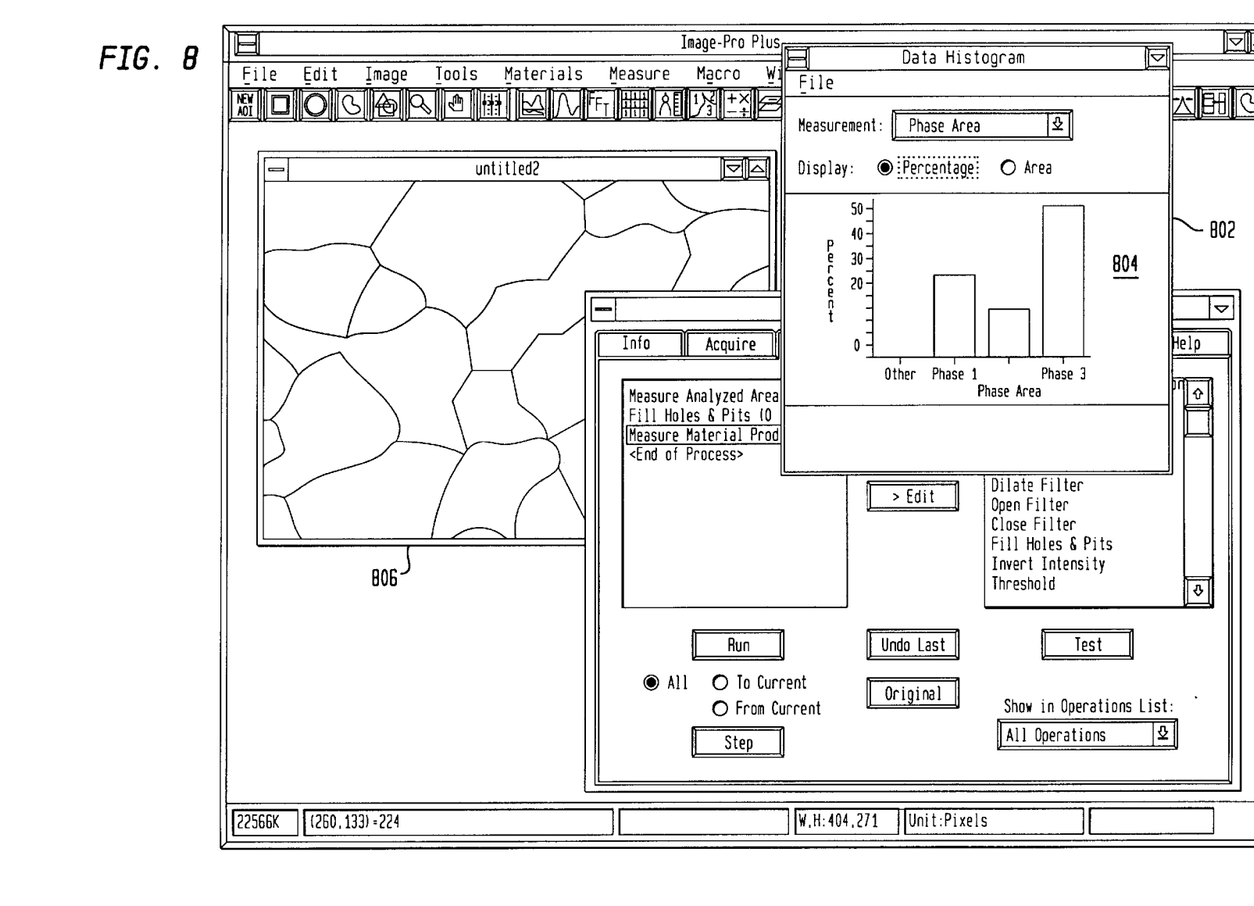

Intermediate results of a grain size process are illustrated in FIG. 7. An image displayed in a window 702 includes markers 704 overlaid on the image according to an implementation specific process step of the present invention. Exemplary phase area results are illustrated in a window 802 in FIG. 8. A data histogram 804 shows a column graph representing the percent of phase area coverage in an image displayed in window 806.

The above description of the invention to analyze microscopic structures of alloys and metals was only presented for example, and not limitation. The system and method of the invention can be adapted to perform graphical image analysis for a variety of applications including, but not limited to, cell biology, forensics, remote sensing, satellite image mapping and surveying, or the like.

3. Environment of the Invention

Figure 9:
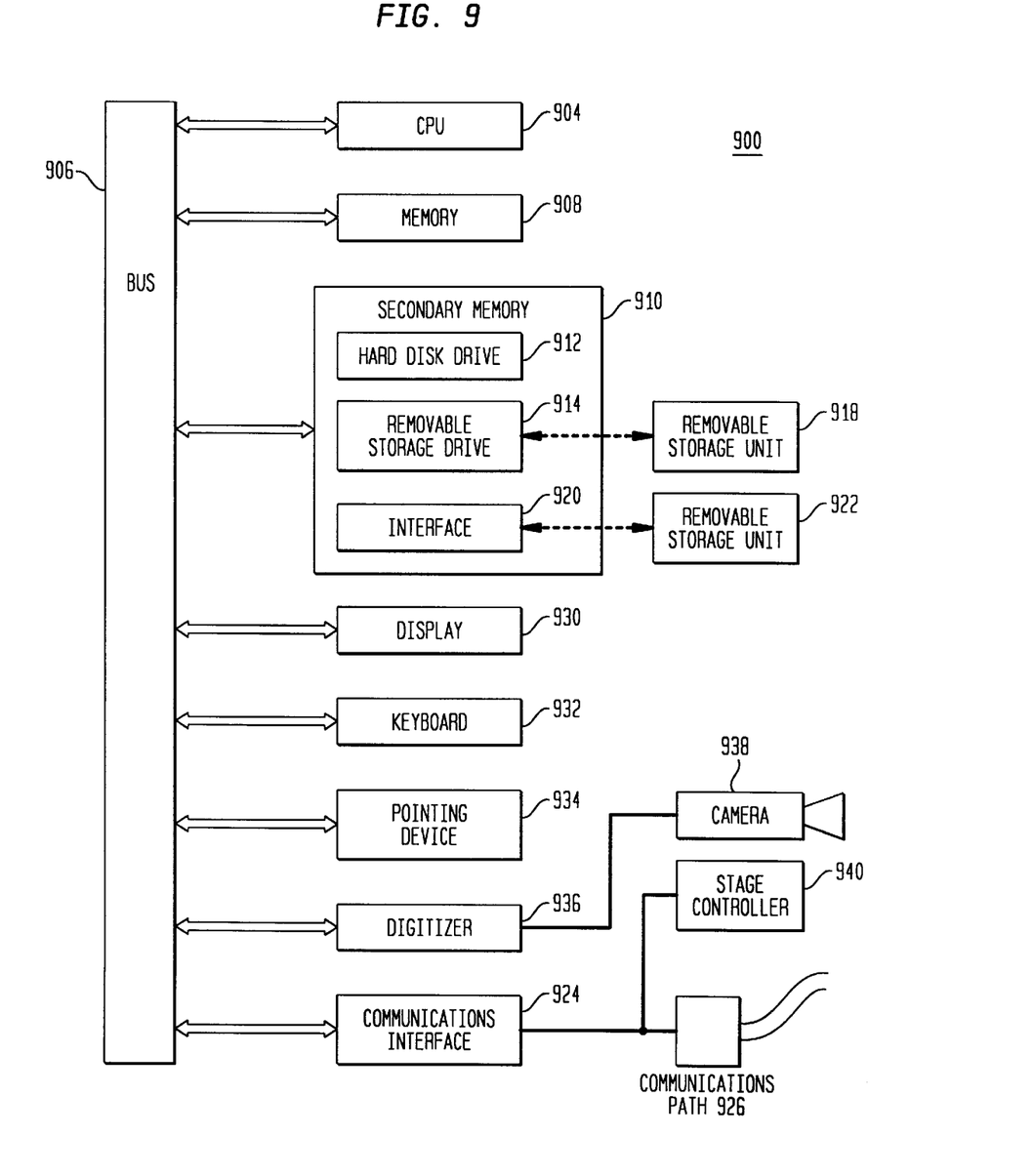
FIG. 9 is a block diagram illustrating an example environment in which the present invention can operate.

FIG. 9 is a block diagram illustrating an example environment in which the present invention can operate. The environment is a computer system 900 that includes one or more processors, such as a central processing unit (CPU) 904. The CPU 904 is connected to a communications bus 906. Various software embodiments are described in terms of this example computer system. After reading this description, it will be apparent to a person skilled in the relevant art how to implement the invention using other computer systems and/or computer architectures.

Computer system 900 also includes a main memory 908, preferably random access memory (RAM), and can also include a secondary memory 910. The secondary memory 910 can include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well known manner. Removable storage unit 918 represents a floppy disk, magnetic tape, optical disk, etc., which is read by and written to by removable storage drive 914. As will be appreciated, the removable storage unit 918 includes a computer usable storage medium having stored therein computer software and/or data.

The computer system 900 also includes conventional hardware such as a display 930, a keyboard 932, and a pointing device 934. A digitizer 936 and a camera 938 can be used for capturing images to process according to the present invention. Alternatively, images can be retrieved from any of the above-mentioned memory units, or via a communications interface 924. A stage controller 940 is used to control the motorized stage and microscope for positioning a sample, as described above in Section 1.

In alternative embodiments, secondary memory 910 may include other similar means for allowing computer programs or other instructions to be loaded into computer system 900. Such means can include, for example, a removable storage unit 922 and an interface 920. Examples can include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to computer system 900.

The communications interface 924. Communications interface 924 allows software and data to be transferred between computer system 900 and external devices via communications path 926. Examples of communications interface 924 can include a modem, a network interface (such as an Ethernet card), a communications port (e.g., RS-232), etc. Software and data transferred via communications interface 924 are in the form of signals which can be electronic, electromagnetic, optical or other signals capable of being received by communications interface 924 via communications path 926. Note that communications interface 924 provides a means by which computer system 900 can interface to a network such as the Internet. According to a preferred embodiment of the invention, the communications interface 924 can send control signals to a camera or microscope and stage, and data from the camera or microscope can be transferred back to computer system 900. This interface can be parallel, serial, bi- or unidirectional.

The present invention is described in terms of this example environment. Description in these terms is provided for convenience only. It is not intended that the invention be limited to application in this example environment. In fact, after reading the following description, it will become apparent to a person skilled in the relevant art how to implement the invention in alternative environments.

4. Software and Hardware Embodiments

The present invention is preferably implemented using software running (that is, executing) in an environment similar to that described above with respect to FIG. 9. In this document, the term "computer program product" is used to generally refer to removable storage device 918 or a hard disk installed in hard disk drive 912. These computer program products are means for providing software to computer system 900.

Computer programs (also called computer control logic) are stored in main memory and/or secondary memory 910. Computer programs can also be received via communications interface 924. Such computer programs, when executed, enable the computer system 900 to perform the features of the present invention as discussed herein. In particular, the computer programs, when executed, enable the processor 904 to perform the features of the present invention. Accordingly, such computer programs represent controllers of the computer system 900.

In an embodiment where the invention is implemented using software, the software may be stored in a computer program product and loaded into computer system 900 using removable storage drive 914, hard drive 912 or communications interface 924. Alternatively, the computer program product may be downloaded to computer system 900 over communications path 926. The control logic (software), when executed by the processor 904, causes the processor 904 to perform the functions of the invention as described herein.

In another embodiment, the invention is implemented primarily in hardware using, for example, hardware components such as application specific integrated circuits (ASICs). Implementation of a hardware state machine so as to perform the functions described herein will be apparent to persons skilled in the relevant art(s).

5. Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents. All cited patent documents and publications in the above description are incorporated herein by reference.

What is claimed is:

1. A method that permits a user to view an image of an object on a graphical user interface (GUI) and perform operations on the image, comprising the steps of:

(a) displaying a set of pictorial representation types on the GUI;

(b) allowing the user to select one of said pictorial representation types, such that the user performs said selection based on determining which of said set of pictorial representation types most closely resembles the image of the object, rather than based on an operation that the user wishes to perform on the image of the object; and (c) performing a process on the image based on said selection.

2. The method according to claim 1, further comprising the step of displaying the image of the object on the GUI.

3. The method according to claim 1, further comprising the step of providing access to a database including files of pictorial representation types, said files being organized according to categories of related objects.

4. The method according to claim 1, further comprising the step of permitting the user to modify said process.

5. The method according to claim 1, wherein said process comprises a group of separate operations.

6. The method according to claim 1, wherein said step of performing further comprises the step of performing said process on an image stream.

7. The method according to claim 6, wherein said image stream comprises a group of static images.

8. The method according to claim 6, wherein said image stream comprises video.

9. The method according to claim 1, wherein said step of performing a process on the image does not alter the displayed image of the object.

10. The method according to claim 1, further comprising the step of displaying results of said process.

11. A computer based system for performing graphical image processing on an image of an object, comprising:

(a) a GUI having
        (i) a display area to display a set of pictorial representation types; and
        (ii) selection means for allowing a user to select one of said displayed pictorial representation types, such that the user performs said selection based on determining which of said set of pictorial representation types most closely resembles the image of the object, rather than based on an operation that the user wishes to perform on the image of the object; and (b) processing means for performing a process on the image based on said selection.

12. The computer based system according to claim 11, further comprising display means to display the image of the object on a GUI.

13. The computer based system according to claim 11, further comprising access means providing access by the user to a database including files of pictorial representation types, said files being organized according to categories of related objects.

14. The computer based system according to claim 11, further comprising editing means for permitting the user to modify said process.

15. The computer based system according to claim 11, wherein said process comprises a group of separate operations.

16. The computer based system according to claim 11, wherein said selection means performs said process on an image stream.

17. The computer based system according to claim 16, wherein said image stream comprises a group of static images.

18. The computer based system according to claim 16, wherein said image stream comprises video.

19. The computer based system according to claim 11, wherein the displayed image of the object is not altered after said selection.

20. The computer based system according to claim 11, further comprising means for displaying results of said process.

21. A computer program product for permitting a computer system to perform graphical image processing on an image of an object, said computer program product comprising:

a computer usable medium having computer readable program code means embodied in said medium for causing an application program to execute on the computer system, said computer readable program code means comprising:

a computer readable first program code means for causing the computer system to display a set of pictorial representation types;

a computer readable second program code means for causing the computer system to allow a user to select one of said displayed pictorial representation types, such that the user performs said selection based on determining which of said set of pictorial representation types most closely resembles the image of the object, rather than based on an operation that the user wishes to perform on the image of the object; and a computer readable third program code means for causing the computer system to perform a process on the image based on said selection.

22. The computer program product of claim 21, wherein said computer readable program code means further comprises:

a computer readable fourth program code means for causing the computer system to display the image of the object on a GUI.

23. The computer program product of claim 21, wherein said computer readable program code means further comprises:

a computer readable sixth program code means for causing the computer system to permit the user to modify said process.

24. The computer program product of claim 21, wherein said process comprises a group of separate operations.

25. The computer program product of claim 21, wherein said computer readable second program code means causes the computer system to perform said process on an image stream.

26. The computer program product of claim 25, wherein said image stream comprises a group of static images.

27. The computer program product of claim 25, wherein said image stream comprises video.

28. The computer program product of claim 21, wherein the displayed image of the object is not altered after said selection.

29. The computer program product of claim 21, wherein said computer readable program code means further comprises:

a computer readable fifth program code means for causing the computer system to display results of said process.

* * * * *